United States Patent [19]

Thompson

[11] Patent Number: 4,828,847

[45] Date of Patent: May 9, 1989

[54] HYDROLYZED CASEIN PREPARATION

[75] Inventor: Robert M. Thompson, Minneapolis, Minn.

[73] Assignee: Kerry Foods, Inc., Jackson, Wis.

[21] Appl. No.: 97,127

[22] Filed: Sep. 16, 1987

[51] Int. Cl.$^4$ ................................................ A23C 9/12
[52] U.S. Cl. ........................................ 426/42; 426/61; 426/62; 426/63; 426/580; 426/657; 426/643
[58] Field of Search ................... 426/42, 61, 63, 643, 426/580, 656, 657, 62

[56] References Cited

U.S. PATENT DOCUMENTS

| | | | |
|---|---|---|---|
| 2,547,136 | 4/1951 | Oberg et al. | 426/42 |
| 3,036,918 | 5/1962 | Wingerd et al. | 426/42 |
| 4,600,588 | 7/1986 | Ernster | 426/42 |

*Primary Examiner*—Marianne Cintins

*Attorney, Agent, or Firm*—Wood, Dalton, Philips, Mason & Rowe

[57] ABSTRACT

A process for providing yield enhancement of canned tuna fish. A dry storage hydrolyzed caseinate product is firstly produced by firstly providing acid precipitated casein. The acid precipitated casein is agitated with hydroxide solution while maintaining the mixture substantially dry. The mixture is allowed to cool to ambient temperature and a dry enzyme is uniformly distributed therein in a ratio of at least 0.1% by weight. A broth is subsequently formed by dispersing the dry hydrolyzed caseinate in a 5–10% by weight aqueous dispersion. The dispersion is heated to a temperature in the range of approximately 160° F. to 190° F. and used to effect enhanced yield of precooked tuna fish to be subsequently canned.

17 Claims, No Drawings

HYDROLYZED CASEIN PREPARATION

TECHNICAL FIELD OF THE INVENTION

This invention relates to hydrolized casein preparation and in particular to the preparation of a dry storage hydrolized casein product, a broth made therefrom, and the use of the broth in providing high yield canned tuna fish and the like.

BACKGROUND ART

It has been found desirable to minimize the amount of water in canned food products such as tuna fish.

In one commonly used process effecting such yield improvement, the tuna fish is treated with hydrolyzed casein. One common hydrolyzed casein so utilized comprises a precipitated casein subjected to a high pH such as a pH of 9 or more. The use of monovalent hydroxide, such as sodium and potassium hydroxide, is conventional where a clear liquid is desired.

Divalent hydroxide, such as calcium hydroxide, has also been used to hydrolyze the casein where a milky liquid is acceptable.

It has also been indicated in the prior art that simple sodium caseinate does not perform the desired function.

Such alkaline hydrolyzed caseins have not proven completely satisfactory. The high pH of the indicated process presents a serious physiological irritant and health hazard to the people who handle the material. The high pH also causes severed machine corrosion and wear, concrete floor corrosion, and the stripping of paint from associated processing machinery. It has also been found that the use of such highly caustic alkaline hydrolyzed casein may reduce the shelf life of the canned tuna by approximately one-half due to accelerated corrosion of the can and enamel liner. A caseinate alternative has been produced by subjection of the caseinate to enzymes which cleave bonds in the K-casein fraction. Unless calcium is present in the system precipitation does not occur, nothwithstanding the K-casein cleavage. In such precipitation, the destabilized casein micelle uptakes calcium so as to define a calcium cross-linked mass.

Solubilization of the enzyme precipitated casein is conventionally effected by exposure thereof to a high pH such as 9.0 or above.

Resolubilized enzyme precipitated casein exhibits a substantially higher viscosity than resolubilized acidified casein.

A wide variety of enzymes capable of effecting precipitation of casein from milk is known. These include chymosin (commonly referred to as calf rennet), pepsin, chymotrypsin, and microbial enzymes biochemically related to chymosin in their mode of action and specificity. Such microbial enzymes include, but are not limited to, enzymes from *Mucor pusilis, Mucor meihi,* and endothia parasitica. Conventional proteolytic enzymes for treating casein include pancreatin, bromelin, and various proteolytic fungal and bacterial enzymes.

DISCLOSURE OF INVENTION

The present invention comprehends the provision of an improved process for providing high yield canned tuna fish by subjection of the tuna fish to a hydrolyzed caseinate product in the form of a broth made from dry storage enzymatically hydrolyzed caseinate.

More specifically, the invention comprehends the process of preparing a dry storage hydrolyzed caseinate product including the steps of providing acid precipitated casein, agitating the acidified casein with hydroxide solution while maintaining the mixture substantially dry, allowing the mixture to cool to ambient temperature, and uniformly distributing dry enzyme in the dry mixture in a ratio of at least 0.1% of the enzyme by weight to form a dry enzymatically hydrolyzed caseinate.

The invention further comprehends the preparing of the yield improvement broth from such a enzymatically hydrolyzed caseinate product by subjecting the product to the further steps of dispersing said dry hydrolyzed caseinate by agitating the acidified casein with hydroxide solution while maintaining the mixture substantially dry, allowing the mixture to cool to ambient temperature, dispersing said dry hydrolyzed casein in water at a temperature in the range of approximately 50° F. to 90° F. in a ratio of approximately 5% to 10% by weight, and heating the dispersion to a temperature in the range of approximately 160° F. to 190° F. to form a tuna fish yield improvement broth.

Still further the invention comprehends the use of the yield improvement broth in providing high yield canned tuna fish by canning the tuna fish in the broth of the enzymatically modified caseinate.

The invention comprehends that the enzyme have high peptide bond specificity and exhibit limited proteolysis.

In subjecting the acidified casein to the neutralizing hydroxide, it is preferable that the casein have a mesh size in the range of approximately 30 to 80.

The neutralizing hydroxide may be provided in the form of a 50% solution for facilitated manufacture of the neutralized caseinate.

The processes of the present invention are extremely simple and economical while yet providing a highly improved high yield canned tuna product.

BEST MODE FOR CARRYING OUT THE INVENTION

The invention comprehends the precipitation of casein from milk by acidification to the isoelectric point which conventionally is at a pH of approximately 4.5 to 4.7.

The precipitated casein is next subjected to a hydroxide solution to adjust the pH to approximately 7.0 or less. The acidified casein preferably has a mesh size in the range of 30 to 80 and preferably approximately 80. The hydroxide is provided as a 50% solution. Monovalent hydroxide, such as sodium, potassium and ammonium hydroxides, are preferred because of the clarity of the resultant product. Where a milky appearance is satisfactory, a divalent hydroxide such as calcium hydroxide may be utilized.

The invention comprehends the neutralizing of the acid precipitated casein before mixing a proteolytic enzyme therewith. The resultant mixture of the caseinate and enzyme is substantially dry and may be suitably bagged for storage and shipment.

Prior to treating the tuna fish with the caseinate/enzyme mixture, the mixture is dispersed in water to form a 5-10% by weight solution. The water is preferably at a temperature in the range of approximately 50° F. to 90° F.

Upon completion of the dispersion, the solution is heated to approximately 160° F. to 190° F. and used as a broth to be added to cooked tuna fish for subsequent canning. The enzyme reacted caseinate substantially increases the press weight of the tuna fish thus serving as an improved yield enhancing additive.

The invention broadly comprehends the addition of a microbial rennet enzyme to the caseinate to form a dry mixture suitable for storage and shipment prior to the formation of the tuna fish treating broth therefrom. In the preferred form, the enzyme is added to neutralized caseinate which is preferably at a pH of approximately 7.0. As will be obvious to those skilled in the art however, the enzyme may be added to the caseinate having a pH other than 7.0 within the broad scope of the invention.

The treatment of the precipitated acidified casein with the neutralizing hydroxide solution may be effected with vigorous agitation in a dry blender such as a ribbon blender. As is well known, the reaction of the hydroxide with the acidified casein to produce sodium caseinate is an exothermic reaction. The agitation of the mixture is continued until the mixture is dry and returns to ambient temperature.

The enzyme is preferably blended with the dry neutralized casein in a dry blender until the enzyme is uniformly distributed therein. The invention comprehends the use of a fungal enzyme, and more specifically the use of *Mucor pusilis* and *Mucor meihi,* as the enzymatic hydrolyzing agent. Other suitable enzymes include chymotrypsin or any of the biochemically related carboxyl proteases, such as chymosin, pepsin, and enzymes obtained from fungal microbial sources, such as endothia parasitica.

The enzyme is preferably present in an amount of at least 0.1% by weight with respect to the weight of the neutralized caseinate.

A broth is formed from the hydrolyzed caseinate by the addition thereof to water in the amount of 5% to 10% by weight. The water is preferably at a temperature of 50° F. to 90° F.

Upon full dispersion of the hyrolyzed casein in the water, the resultant broth is heated to a temperature in the range of approximately 160° F. to 190° F. and then utilized as an additive to the tuna fish for effecting the desired enhanced yield, or pressed weight, of the canned tuna fish.

The enzymatically hydrolyzed caseinate provides an improved yield enhancer avoiding the highly caustic, odoriferous, corrosive and taste-affecting characteristics of the high alkalinity hydrolyzed caseins heretofore utilized for such yield enhancement.

EXAMPLE

A dry storage hydrolyzed caseinate product embodying the invention was made in accordance with the above-disclosed process wherein a 50% sodium hydroxide solution was used to neutralize the acidified casein from the acidified pH of approximately 4.6 to pH 6.8.

The agitation was continued for approximately 15–20 minutes until the mixture appeared dry and cool.

*Mucor meihi* enzyme was then blended in the neutralized casein at a concentration of 0.1% by weight for approximately 10 minutes until the enzyme was uniformly distributed.

A product was subsequently dispersed in water to form a 6% by weight dispersion, at a temperature 70° F. Upon complete dispersion of the hydrolyzed caseinate in the water, the dispersion was heated to 170° F. and added to precooked tuna fish having substantially all of the fat removed. The thusly treated tuna fish was found to have substantially improved water retention characteristics The foregoing disclosure of specific embodiments is illustrative of the broad inventive concepts comprehended by the invention

I claim:

1. A process for preparing a dry storage hydrolyzed casein product, comprising the steps of:
   providing acid precipitated casein;
   neutralizing the acidified casein by agitating acidified casein with hydroxide solution to form, as a result of said neutralizing, a warm, substantially dry mixture;
   allowing said mixture to cool to ambient temperature; and
   uniformly distributing dry enzyme, capable of forming an enzymatically hydrolyzed caseinate with said mixture, in said mixture in a ratio of at least 0.1% of the enzyme by weight to form a dry enzymatically hydrolyzed caseinate, said dry enzyme comprising an enzyme selected from the group consisting of carboxyl protease enzymes and chymotrypsin to form an enzymatically hydrolyzed caseinate.

2. A process for preparing a yield improvement broth for canned tuna fish, comprising the steps of:
   providing acid precipitated casein;
   neuteralizing the acidified casein by agitating the acidified casein with hydroxide solution to form, as a result of said neutralizing, a warm, substantially dry mixture;
   allowing said mixture to cool to ambient temperature;
   uniformly distributing dry enzyme, capable of forming an enzymatically hydrolyzed caseinate with said mixture, in said mixture in a ratio of at least 0.1% of the enzyme by weight to form a dry enzymatically hydrolyzed caseinate, said dry enzyme comprising an enzyme selected from the group consisting of carboxyl protease enzymes and chymotrypsin to form an enzymatically hydrolyzed caseinate;
   dispersing said dry hydrolyzed caseinate in water at a temperature in the range of approximately 5% to 10% by weight; and
   heating the dispersion to a temperature in the range of approximately 160° F. to 90° F. to form a tuna fish yield improvement broth.

3. A process for providing high yield canned tuna fish, comprising the steps of:
   providing acid precipitated casein;
   neutralizing the acidified casein by agitating the acidified casein with hydroxide solution to form, as a result of said neutralizing, a warm, substantially dry mixture;
   allowing said mixture to cool to ambient temperature;
   uniformly distributing dry enzyme, capable of forming an enzymatically hydrolyzed caseinate with said mixture, in said mixture in a ratio of at least 1% of the enzyme by weight to form a dry enzymatically hydrolyzed caseinate, said dry enzyme comprising an enzyme selected from the group consisting of carboxyl protease enzymes and chymotrypsin to form an enzymatically hydrolyzed caseinate;
   dispersing said dry hydrolyzed caseinate in water at a temperature in the range of approximately 50° F. to 90° F. in a ratio of approximately 5% to 10% by weight; and
   canning tuna fish in said broth.

4. The process of claim 1, 2 or 3 wherein said hydroxide comprises an alkali hydroxide.

5. The process of claim 1, 2 or 3 wherein said hydroxide comprises a monovalent hydroxide.

6. The process of claim 1, 2 or 3 wherein said enzyme comprises *Mucor pusilis* fungal enzyme.

7. The process of claim 1, 2 or 3 wherein said enzyme comprises *Mucor meihi* fungal enzyme.

8. The process of claim 1, 2 or 3 wherein said acidified casein has a pH of approximately 4.5 to 4.7.

9. The process of claim 1, 2 or 3 wherein said acidified casein has a mesh size in the range of approximately 30 to 80.

10. The process of claim 1, 2 or 3 wherein said acidified casein has a mesh size of approximately 80.

11. The process of claim 1, 2 or 3 wherein said step of agitation comprises a step of blending the acidified casein with the hydroxide solution in a dry blender.

12. The proess of claim 1, 2 or 3 wherein said step of uniformly distributing the enzyme comprises a step of blending the enzyme with the dry mixture in a dry blender.

13. The process of claim 1, 2 or 3 wherein the hydroxide solution is present in a sufficient quantity to bring the pH to approximately 6.8 to 7.0.

14. The process of claim 1, 2 or 3 wherein the step of neutralizing the acidified casein comprises a step of raising the pH to no more than approximately 7.0.

15. The process of claim 1, 2 or 3 wherein the enzyme comprises a carboxyl protease.

16. The process of claim 1, 2 or 3 wherein the enzyme comprises any one of the group of chymosin, pepsin, and endothia parasitica.

17. The process of claim 1, 2 or 3 wherein the enzyme comprises chymotrypsin.

* * * * *